United States Patent [19]

Washizuka et al.

[11] 4,081,664
[45] Mar. 28, 1978

[54] CALCULATOR OPERATION TIME PERIOD COUNTER IN A COMBINATION OF ELECTRONIC TIMEPIECE AND ELECTRONIC CALCULATOR

[75] Inventors: Isamu Washizuka, Kyoto; Shintaro Hashimoto, Nara, both of Japan

[73] Assignee: Sharp Kabushiki Kaisha, Osaka, Japan

[21] Appl. No.: 675,595

[22] Filed: Apr. 9, 1976

[30] Foreign Application Priority Data

Apr. 11, 1975   Japan .................................. 50-49923

[51] Int. Cl.² ........................ G06F 7/38; G06F 15/02; G04B 37/12
[52] U.S. Cl. .................................. 364/705; 58/23 BA; 58/50 R; 58/152 R; 324/186; 364/569
[58] Field of Search ................ 235/156; 324/186, 189; 58/23 BA, 39.5, 50 R, 145 R, 152R, 152 H

[56] References Cited

U.S. PATENT DOCUMENTS

| | | | |
|---|---|---|---|
| 3,011,122 | 11/1961 | McKenna | 324/181 |
| 3,656,060 | 4/1972 | Bauernfeind et al. | 324/186 |
| 3,818,457 | 6/1974 | Schleifer | 340/324 R X |
| 3,854,281 | 12/1974 | Reichert | 324/189 X |
| 3,876,867 | 4/1975 | Schull et al. | 324/186 X |
| 3,898,790 | 8/1975 | Takamune et al. | 58/23 BA |
| 3,928,960 | 12/1975 | Reese | 235/156 X |
| 3,955,355 | 5/1976 | Luce | 235/156 X |
| 3,971,205 | 7/1976 | Nomura et al. | 58/50 R |

*Primary Examiner*—Jerry Smith
*Attorney, Agent, or Firm*—Birch, Stewart, Kolasch & Birch

[57] ABSTRACT

In a combination of an electronic timepiece and an electronic calculator including a power source, a time keeping circuit, a calculation circuit, a keyboard unit for introducing information into the calculation circuit, and a display unit for displaying information stored in the time keeping circuit and the calculation circuit, a time period counter is provided for counting the time period when the electronic calculator is actually operated. The time period when the electronic calculator is actually operated is approximately proportional to the total power dissipation of the power source. The contents of the time period counter are displayed on the display unit for indicating the power dissipation of the power source.

5 Claims, 3 Drawing Figures

CALCULATOR OPERATION TIME PERIOD COUNTER IN A COMBINATION OF ELECTRONIC TIMEPIECE AND ELECTRONIC CALCULATOR

BACKGROUND OF THE INVENTION

The present invention relates to a combination timepiece and calculator and more particularly to an electronic timepiece having an arithmetic calculation capability.

In general a combination timepiece and calculator includes a power source, a time keeping circuit, a calculation circuit, a keyboard unit for introducing information into the calculation circuit, a display unit for displaying information stored in the time keeping circuit and the calculation circuit, and a mode switch for controlling the power supply to the calculation circuit.

A typical construction of a combination wristwatch and calculator is shown in, for example, U.S. Pat. No. 3,928,960, Robert O. Reese "COMBINATION WRISTWATCH AND CALCULATOR," issued on Dec. 30, 1975.

Generally, an electronic digital timepiece consumes little power and, more particularly, consumes power of below twenty microwatts (20 μW). Therefore, the electronic digital timepiece can continuously work for more than one (1) year without changing its power source such as a cell, or charging up its battery. Whereas, an electronic calculator consumes considerably large power and, more specifically, of about ten milliwatts (10 mW). It will be clear that the electronic calculator consumes power of from one hundred (100) to one thousand (1,000) times that of an electronic digital timepiece. Accordingly, in a combination timepiece and calculator, the total power dissipation of the power source is mostly determined by the time period when the electronic calculator is actually operated. Therefore, there is a possibility that the electronic digital timepiece, though it is not preferable, ceases its operation after considerably short period operation. Needless to say, sudden termination of the timepiece operation causes trouble and, therefore, the cell must be exchanged or the battery must be charged up before the electronic timepiece ceases its operation.

OBJECTS AND SUMMARY OF THE INVENTION

Accordingly, an object of the present invention is to provide an improved combination of an electronic digital timepiece and an electronic calculator.

Another object of the present invention is to secure continued timepiece operation in a combination timepiece and calculator.

Still another object of the present invention is to provide indication representative of power dissipation of a power source in a combination timepiece and calculator.

Yet another object of the present invention is to provide a counter for counting a time period when an electronic calculator is actually operated in a combination timepiece and calculator.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objectives, pursuant to an embodiment of the present invention, in a combination of an electronic digital timepiece and electronic calculator wherein the timepiece function and the calculator function are organically combined with each other, a time period counter is provided for counting the time period when the electronic calculator is actually operated. A switching means associated with a mode switch which controls the power supply to a calculation circuit included within the electronic calculator and controls the counting operation of the time period counter.

In a preferred form, the contents of the time period counter are displayed, upon receiving a command from the operator, on a display unit for indicating the time period when the electronic calculator is actually operated, which is approximately proportional to the total power dissipation of a power source of the combination electronic digital timepiece and electronic calculator. the power source such as a cell should be exchanged or a battery should be charged up when the contents of the time period counter exceed a predetermined value in order to secure the continuous operation of the electronic digital timepiece in the combination timepiece and calculator.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
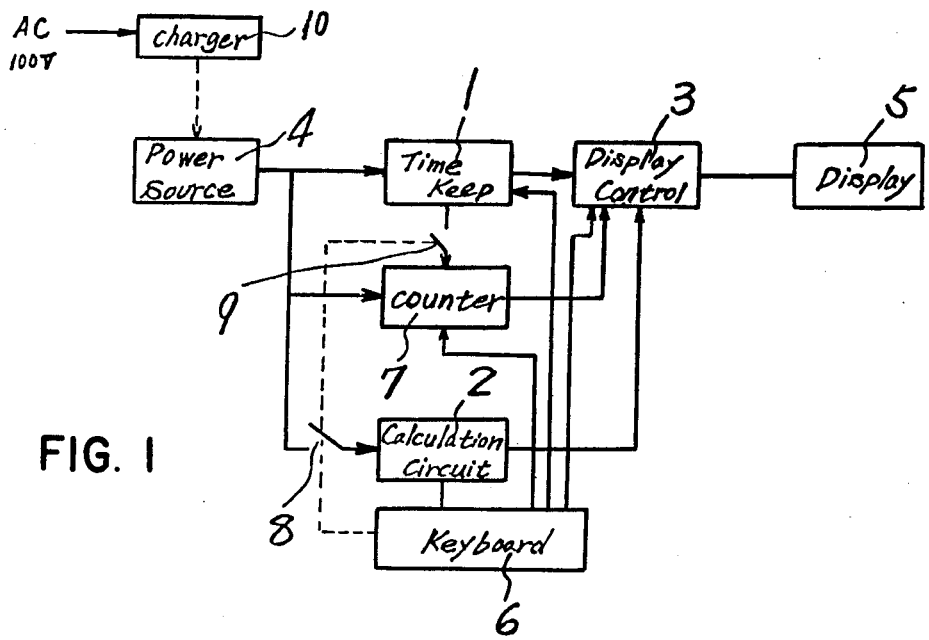
FIG. 1 is a schematic circuit diagram of an embodiment of a combination electronic timepiece and electronic calculator including a calculator operation time period counter of the present invention.

Referring now to FIG. 1, there is illustrated an embodiment of a combination timepiece and calculator of the present invention, the combination electronic digital timepiece and calculator mainly includes a time keeping circuit 1 for a timepiece function, an arithmetic calculation circuit 2 for a calculator function, a display control 3 and a power source 4.

the combination electronic digital timepice and calculator further includes a display 5 and a keyboard unit 6 which are exposed to the ambience of the apparatus. The keyboard unit 6 functions to control the arithmetic calculation circuit 2 for performing the calculation operation, to control introduction of a time information correction signal into the time keeping circuit 1, and to develop a control signal to the display control 3 in order to select the information display between the contents stored in the time keeping circuit 1, the arithmetic calculation circuit 2 and a calculator operation time period counter 7 of the present invention. A detailed construction of the calculator operation time period counter 7 will be described later with reference to FIG. 3.

The power source 4 continuously supplies the power to the time keeping circuit 1 and the calculator operation time period counter 7, and temporarily supplies the power to the arithmetic calculation circuit 2 through a switch 8. The switch 8 is controlled through the keyboard unit 6 in such a manner that the arithmetic calculation circuit 2 is enabled only when a mode switch included within the keyboard unit 6 is switched to a calculation mode. The switch 8 is associated with a switch 9 disposed between the time keeping circuit 1 and the calculator operation time period counter 7.

When the combination electronic digital timepiece and calculator is desired to function as an electronic calculator, the switches 8 and 9 are closed, thereby to activate the arithmetic calculation circuit 2 and to supply the calculator operation time period counter 7 with, for example, a minute signal derived from the time keeping circuit 1. The calculator operation time period counter 7 counts a time period when the apparatus is used as an electronic calculator, and the contents of the calculator operation time period counter 7 are indicated on the display 5 through the display control 3.

When the switches 8 and 9 are opened, the arithmetic calculation circuit 2 is disabled and the calculator operation time period counter 7 ceases its counting operation. But the contents of the calculator operation time period counter are maintained, because the calculator operation time period counter 7 continuously receives the power supply from the power source 4 without regard to the closing or opening of the switch 9. The contents of the calculator operation time period counter 7 can be either continuously displayed on the display 5, temporarily displayed on the display 5 upon receiving a command from the operator, or temporarily displayed on the display 5 when the combination timepiece and calculator is used as an electronic calculator.

A typical circuit construction of the display control 3 suited for selectively controlling the display of the current time information and of the calculator operation time period will be described later with reference to FIG. 3.

The contents of the calculator operation time period counter 7 show power dissipation of the power source and, therefore, a power cell should be exchanged or a battery should be charged up when the contents of the calculator operation time period counter 7 exceed a predetermined value, for example, fifty (50) hours.

The contents of the calculator operation time period counter 7 can be cleared to zero either through the keyboard unit 6 or through a memory clear switch associated with a charging means when the power source 4 comprises a battery.

Figure 2:
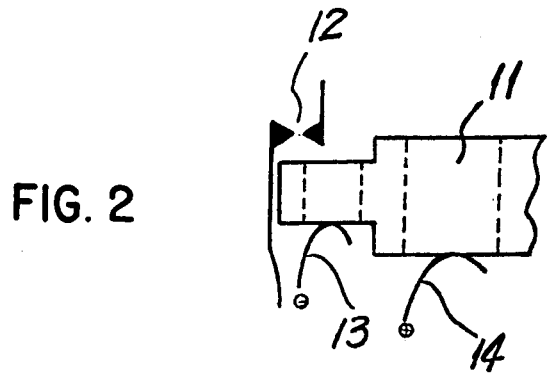
FIG. 2 is a schematic view of a charging plug and jack for use in a charging means of a combination timepiece and calculator of the present invention.

A typical construction of the memory clear switch associated with the charging means will be described with reference to FIG. 2. A memory clear switch 12 is closed when a charging plug 11 of a charging means 10 is inserted into a charging jack associated with the power source 4. The contents of the calculator operation time period counter 7 are cleared to zero when the memory clear switch 12 is closed. In FIG. 2, reference numerals 13 and 14 represent a negative terminal and a positive terminal of the charging jack associated with the power source 4, respectively.

Figure 3:
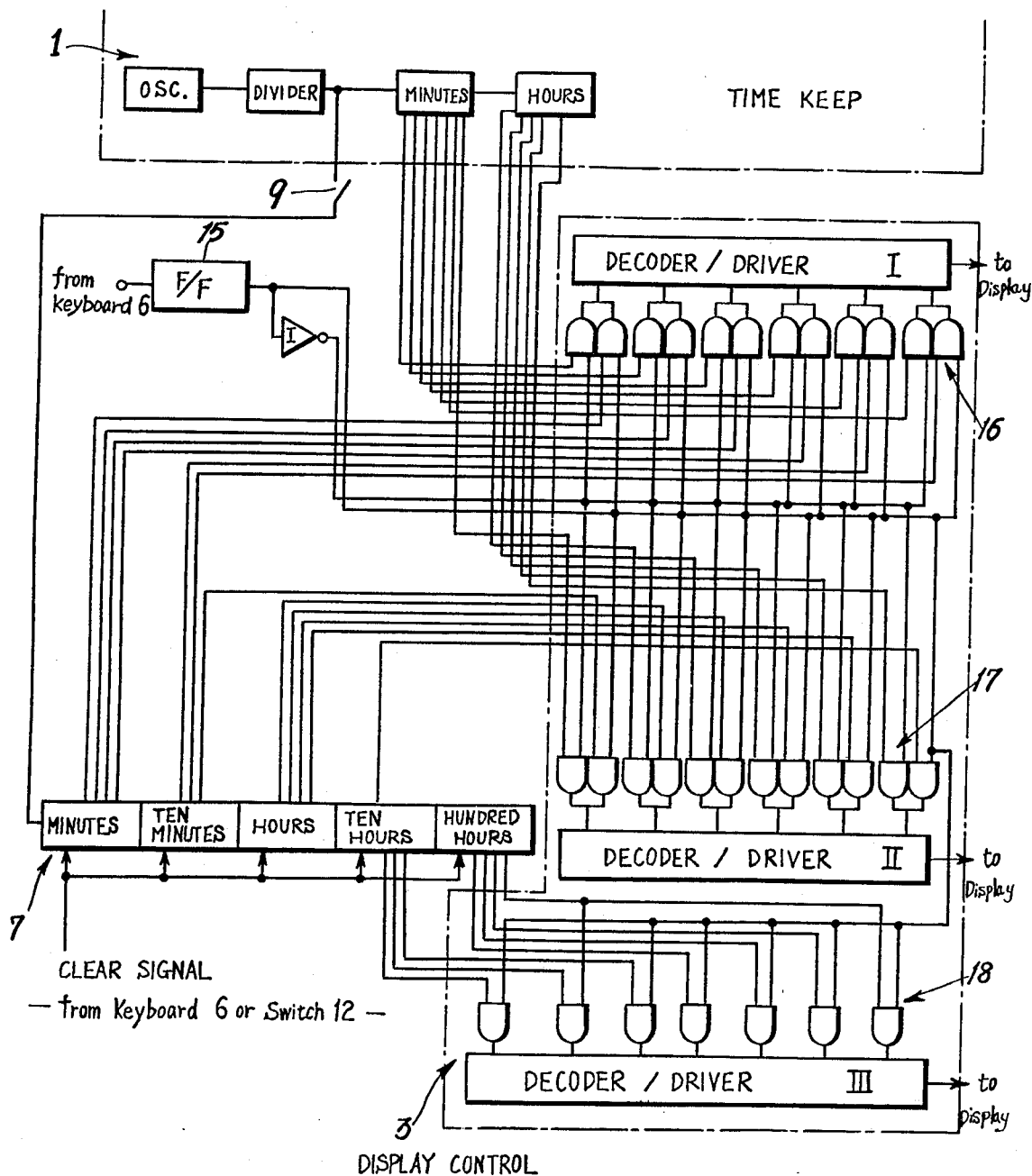
FIG. 3 is a detailed circuit diagram of the calculator operation time period counter of the present invention.

FIG. 3 shows a typical circuit construction of the calculator operation time period counter 7 and the display control 3. In FIG. 3, power supply lines and the circuit construction associated with the calculator operation have been omitted for the purpose of simplicity.

The calculator operation time period counter 7 includes a series of counters for minutes information, ten minutes information, hours information, ten hours information and hundred hours information, and is connected to receive a minute signal from the time keeping circuit 1 through the switch 9. The display control 3 mainly comprises decoder/driver circuits I, II and III, respectively of which function to display the minute information stored in the time keeping circuit 1 and the calculator operation time period counter 7, hour information stored in the time keeping circuit 1 and the calculator operation time period counter 7 below sixty (60) hours, and hour information above sixty (60) hours stored in the calculator operation time period counter 7 on the display 5.

A flip-flop 15 is set through the keyboard 6 when the contents of the calculator operation time period counter 7 is desired to be displayed on the display 5, whereby the decoder/driver circuits I, II and III are controlled, through gate means 16, 17 and 18, to pass the contents of the calculator operation time period counter 7 to the display 5. When the flip-flop 15 is reset, the decoder/driver circuits I and II are activated to pass the information from the time keeping circuit 1 to the display 5.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A power consumption display alarm system for a combination electronic digital timepiece and electronic calculator including a time keeping circuit, an arithmetic calculation circuit, a keyboard unit for introducing information into the arithmetic calculation circuit and a display for displaying information stored in the time keeping circuit and the arithmetic calculation circuit, said power consumption display alarm system comprising:

a. power supply means for supplying power to the time keeping circuit and the arithmetic calculation circuit;

b. first switching means interposed between the power supply and the arithmetic calculation circuit for activating the arithmetic calculation circuit only when the first switching means is operated, said time keeping circuit being activated continuously without operation of the first switching means;

c. a calculator operation time period counter means for counting a time period in response to actuation of the first switching means;

d. second switching means adapted to be operated only when said first switching means is operated, and interposed between the time keeping circuit and the calculation operation time period counter means, thereby introducing a clock signal from the time keeping circuit into the calculator operation time period counter only when the first switching means and the second switching means are operated; and e. power consumption display means contained in said display and connected to the calculator operation time period counter means for displaying information stored within the calculator operation time period counter means, thereby displaying power consumption in said combination electronic digital timepiece and electrical calculator.

2. The combination electronic digital timepiece and electronic calculator of claim 1, which further includes a command switch for temporarily activating the display of the contents of the calculator operation time period counter.

3. The combination electronic digital timepiece and electronic calculator of claim 1, wherein the clock signal from the time keeping circuit is a minute signal.

4. The combination electronic digital timepiece and electronic calculator of claim 1, which further comprises a clear means for clearing the contents of the calculator operation time period counter to zero when the power source is exchanged.

5. The combination electronic digital timepiece and electronic calculator of claim 1, which further comprises a clear means for clearing the contents of the calculator operation time period counter to zero when the power source is charged up.

* * * * *